(12) United States Patent
Shao

(10) Patent No.: US 10,805,221 B2
(45) Date of Patent: Oct. 13, 2020

(54) SERVICE FUNCTION CHAIN (SFC) PATH SELECTION METHOD AND SYSTEM

(71) Applicant: NANNING FUGUI PRECISION INDUSTRIAL CO., LTD., Nanning (CN)

(72) Inventor: Bo-Run Shao, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 114 days.

(21) Appl. No.: 16/182,568

(22) Filed: Nov. 6, 2018

(65) Prior Publication Data
US 2020/0145336 A1    May 7, 2020

(51) Int. Cl.
| | | |
|---|---|---|
| H04L 12/813 | (2013.01) |
| H04L 12/721 | (2013.01) |
| H04L 12/851 | (2013.01) |
| H04L 29/08 | (2006.01) |
| H04L 12/715 | (2013.01) |
| H04L 12/24 | (2006.01) |

(52) U.S. Cl.
CPC ........ *H04L 47/20* (2013.01); *H04L 29/08135* (2013.01); *H04L 41/08* (2013.01); *H04L 41/0893* (2013.01); *H04L 45/44* (2013.01); *H04L 45/64* (2013.01); *H04L 47/2441* (2013.01); *H04L 67/10* (2013.01)

(58) Field of Classification Search
CPC ............... H04L 29/08135; H04L 41/08; H04L 41/0816–0823; H04L 41/0866; H04L 41/0893–0896; H04L 45/44; H04L 45/64; H04L 47/20; H04L 47/24–2441; H04L 67/10; H04L 67/1074–1085
See application file for complete search history.

(56) References Cited

U.S. PATENT DOCUMENTS

| | | | | |
|---|---|---|---|---|
| 9,929,945 | B2* | 3/2018 | Schultz | H04L 43/0876 |
| 2014/0334488 | A1* | 11/2014 | Guichard | H04L 69/22 370/392 |
| 2015/0236948 | A1* | 8/2015 | Dunbar | H04L 45/22 370/225 |
| 2015/0358850 | A1* | 12/2015 | La Roche, Jr. | H04L 45/38 370/328 |
| 2017/0019303 | A1* | 1/2017 | Swamy | H04L 41/0816 |
| 2017/0099194 | A1* | 4/2017 | Wei | H04L 41/5041 |

(Continued)

FOREIGN PATENT DOCUMENTS

CN          107995045         5/2018

OTHER PUBLICATIONS

P. Quinn and T. Nadeau, "Problem statement for service function chaining," RFC 7498, Apr. 2015.*

(Continued)

*Primary Examiner* — Brendan Y Higa
(74) *Attorney, Agent, or Firm* — ScienBiziP, P.C.

(57) ABSTRACT

A service function chain (SFC) path selection method. The disclosed method receives an SFC request for scheduling an SFC, rearranges SFC with respect to workload of service function forwarders (SFFs) utilized in the SFC while conforming to SFC arrangement rules concluded from a history of deployed SFC. The SFC arrangement rules may be created from machine learning processes or manually created by an administrator.

14 Claims, 8 Drawing Sheets

(56) References Cited

U.S. PATENT DOCUMENTS

| | | | |
|---|---|---|---|
| 2017/0126792 A1* | 5/2017 | Halpern | G06F 9/5061 |
| 2017/0230252 A1 | 8/2017 | Khasnabish | |
| 2017/0250917 A1* | 8/2017 | Ruckstuhl | H04L 45/306 |
| 2018/0077247 A1* | 3/2018 | Wang | H04W 72/04 |
| 2018/0102919 A1* | 4/2018 | Hao | H04L 45/38 |
| 2018/0152374 A1 | 5/2018 | Yong et al. | |
| 2018/0225139 A1* | 8/2018 | Hahn | G06F 9/5077 |
| 2018/0331951 A1* | 11/2018 | Boutros | H04L 41/12 |

OTHER PUBLICATIONS

J. Halpern and C. Pignataro, "Service function chaining (SFC) architecture," RFC 7665, Oct. 2015.*

* cited by examiner

SERVICE FUNCTION CHAIN (SFC) PATH SELECTION METHOD AND SYSTEM

BACKGROUND

1. Technical Field

The disclosure relates to computer techniques, and more particularly to service function chain (SFC) path selection.

2. Description of Related Art

Network function virtualization (NFV) is becoming a key driver and architecture in many large enterprise networks. Generally, NFV realizes virtualization of certain network functions that would traditionally be implemented as separate network appliances, such as firewalls, accelerators, intrusion detection, load balances and others.

NFV implementations increasingly employ service function chains (SFCs) to control which functions or services are applied to network traffic. Service function chaining enables virtualized networking functions to be implemented as part of a cloud network. A service function chain defines an ordered list of a plurality of service functions (SFs) that may be applied to packet flows in the network. A packet flow enters the network through a classifier node that generates a service function path (SFP) for that flow according to the service function chain policy. The classifier node encapsulates each packet of the flow with a network service header that indicates the service functions to which the flow will be subjected, and the order the service functions will be applied.

An administrator may determine what service functions should be deployed in a service function chain. A service function path is deployed as an instance of the service function chain. Packets in the path, however, may pass through some service function forwarders for several times.

DETAILED DESCRIPTION

The present disclosure provides a service function chain (SFC) path selection method executable by an electronic device. The SFC path selection method receives request for scheduling a service function path (SFP) and schedules an ordered set of a plurality of service functions (SFs) as a scheduled SFC to respond to the request. The scheduled SFC is generated with respect to workload of a group of service function forwarders (SFFs) associated with the plurality of service functions and conforms to service function arrangement rules concluded from an SFC history of deployed SFCs. The service function arrangement rules include a recognized consistent relationship between two SFs in the SFC history of deployed SFCs. The method deploys the scheduled SFC to respond to the request. The consistent relationship between two SFs may be recognized through various machine learning methods.

The scheduled SFC may be generated from selecting a SFP with a minimized workload of the group of service function forwarders associated with the plurality of service functions. For example, the workload of the group of service function forwarders is measured based on service function forwarder serving time of the group of service function forwarders.

Figure 1:
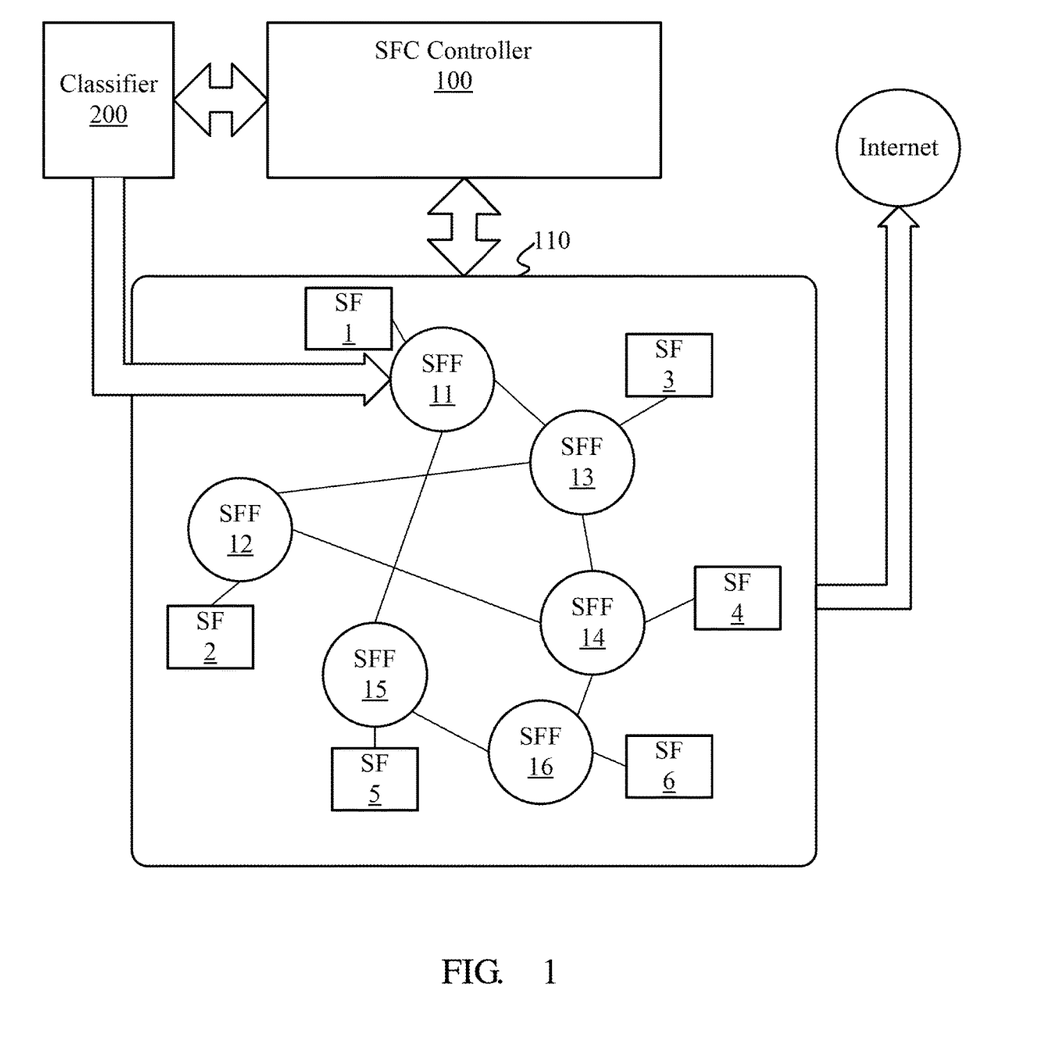
FIG. 1 is a block diagram illustrating an exemplary embodiment of an SFC of the present disclosure.

With reference to FIG. 1, an SFC controller 100 is connected to an SFC classifier 200 and an SF set 110. A classifier is an element that performs classification function. An exemplary definition of classification function may be referred to in Internet Engineering Task Force (IETF) RFC 7665. The SFC classifier 200 may initiate an SFP as an instance of an SFC. An SFP is a mechanism used by service chaining to express the result of applying more granular policy and operational constraints to the abstract requirements of an SFC. In the service function set 110, an SFC classifier 200 is connected to a SFF 11. SFF 11, 12, 13, 14, 15, and 16 respectively connects to SF 1, 2, 3, 4, 5, and 6. The SFF 11 is connected to the SFF 13, and SFF 15. The SFF 12 is connected to the SFF 13, and SFF 14. The SFF 13 is connected to the SFF 11, SFF 12, and SFF 14. The SFF 14 is connected to the SFF 12, SFF 13, and SFF 16. The SFF 15 is connected to the SFF 11, and SFF 16. The SFF 16 is connected to the SFF 14, and SFF 15.

Figure 2:
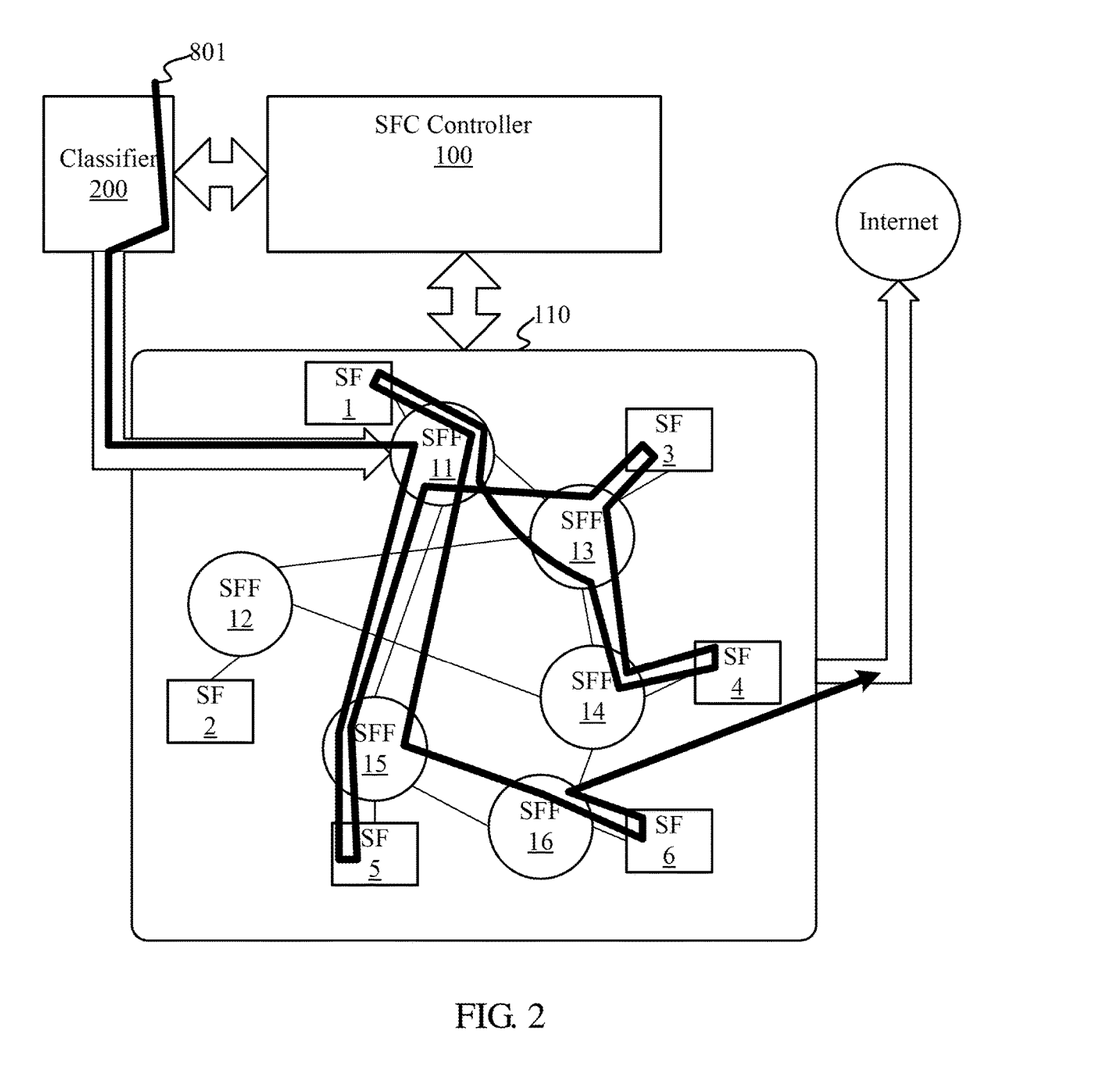
FIG. 2 is block diagram illustrating a packet flow following a service function path.

With reference to FIG. 2, for example, the SFC classifier 200 may generate an original SFC including an ordered set of SFs 5, 3, 4, 1, and 6 before implementing the disclosed path selection method. A flow 801 of SFC packets follows the original SFC. Each SFC packet in the flow 801 is processed by the classifier 200 as shown in FIG. 2, the SFF 11, the SFF 15, the SF 5, the SFF 15, the SFF 11, the SFF 13, the SF 3, the SFF 13, the SFF 14, the SF 4, the SFF 14, the SFF 13, the SFF 11, the SF 1, the SFF 11, the SFF 15, the SFF 16, the SF 6, and the SFF 16. The workload of the SFFs is listed in Table 1.

TABLE 1

| SFP Entities | Workload (Number of Times SFF Processing Service is provided for The Same Group Of Packets) |
|---|---|
| SFF 11 | 4 |
| SFF 12 | 0 |
| SFF 13 | 3 |
| SFF 14 | 2 |
| SFF 15 | 3 |
| SFF 16 | 2 |

A same group of SFC packets in the flow 801 is forwarded to the SFF 11 for four times according to the original SFC. In other words, the flow 801 visits the SFF 11 four times according to the original SFC, and the SFF 11 provides four serving tasks for the same group of SFC packets as shown in FIG. 2. Similarly, the original SFC costs 4 serving tasks of the SFF 11, 3 serving tasks of the SFF 13, 2 serving tasks of the SFF 14, 3 serving tasks of the SFF 15, 2 serving tasks of the SFF 16, and a total of 14 serving tasks of the SFFs.

Figure 3:
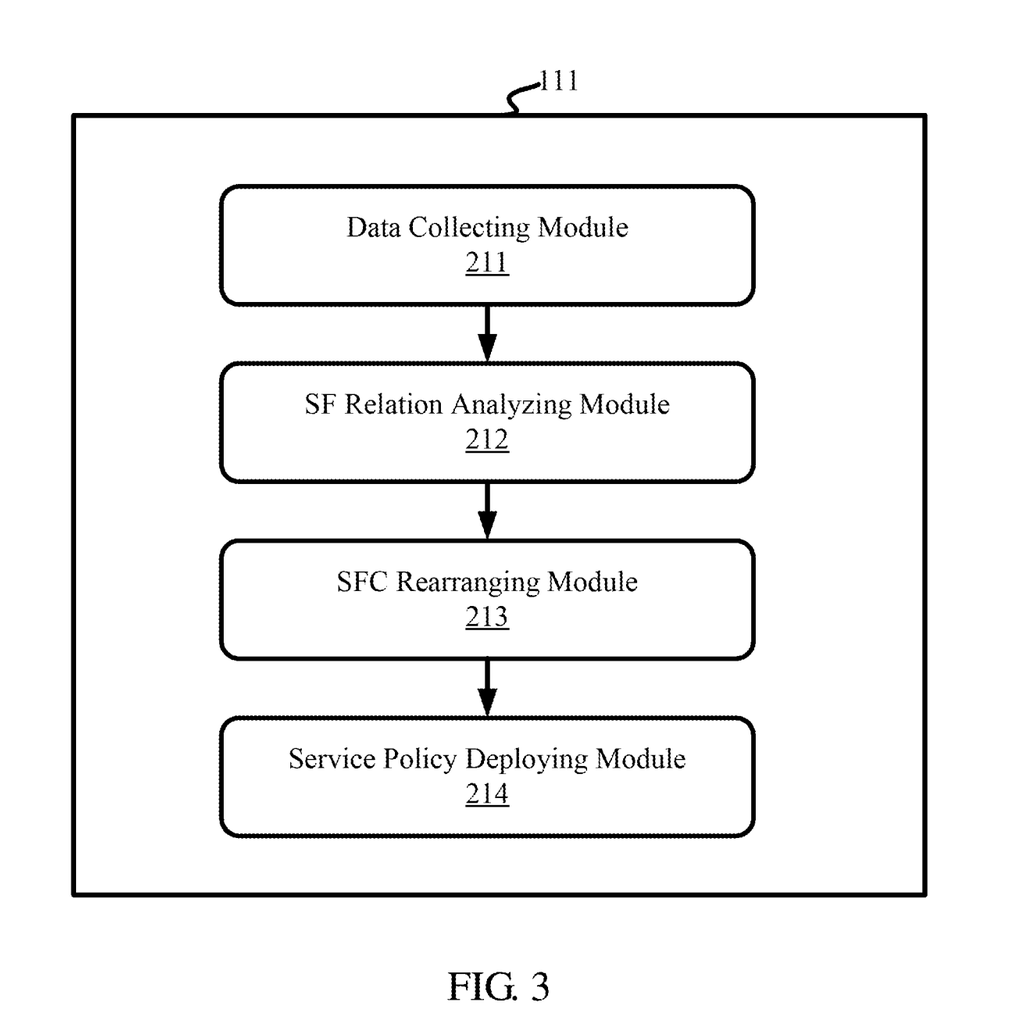
FIG. 3 is a block diagram illustrating an exemplary embodiment of a system including modules for performing the service function chain path selection method.

With reference to FIG. 3, an SFC path selection system 111 includes a data collecting module 211, an SF relation analyzing module 212, a SFP rearranging module 213, and a service policy deploying module 214. The SFC controller 100 may execute the SFC path selection system 111 to implement the SFC path selection method.

Figure 4:
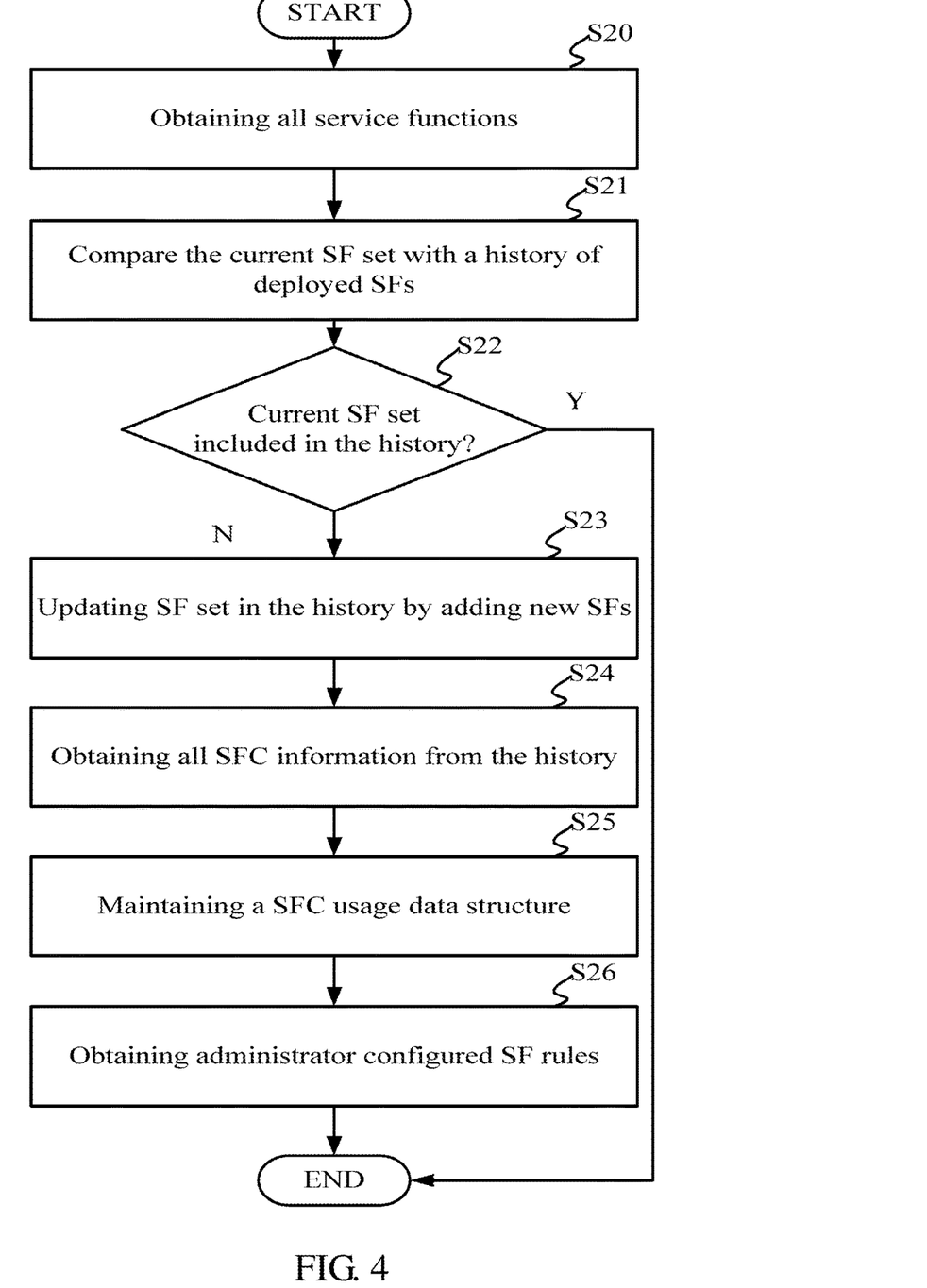
FIG. 4 is a flowchart illustrating a data collection process operable to accumulate deployed service function chains as a history.

With reference to FIG. 4, the data collecting module 211 obtains all service functions in the same domain, such as the SF set 110, as the current SF set (step S20), and compare the current SF set with a history of deployed SFs (step S21). The data collecting module 211 determines whether the current SF set is included in the history of deployed SFs (step S22). If each SF in the current SF set is included in the history, the process of the path selection method progresses to FIG. 5, in which the SF relation analyzing module 212 analyzes relation between each selected couple of SFs in the current SF set. The SF relation analyzing module 212 may perform the relation analyzing to create SF arrangement rules by a machine learning process.

If one or more SFs in the current SF set are not included in the history, the data collecting module 211 updates SF set in the history by adding the one or more SFs of the current SF set to the history (step S23). The data collecting module 211 obtains all SFC information from the history (step S24) and maintains an SFC usage data structure using the obtained SFC information (step S25). The data collecting module 211 generates an SFC usage data structure if no previous version of the SFC usage data structure is in the history, and updates the SFC usage data structure if at least one previous version of the SFC usage data structure is in the history. An example of the SFC usage data structure is shown in Table 2:

TABLE 2

|      | SF 1 | SF 2 | SF 3 | SF 4  | SF 5 | SF 6 |
|------|------|------|------|-------|------|------|
| SF 1 | 0    | 1493 | 1587 | 0     | 1458 | 1404 |
| SF 2 | 1379 | 0    | 1582 | 0     | 1417 | 1362 |
| SF 3 | 0    | 0    | 0    | 12646 | 0    | 0    |
| SF 4 | 1233 | 1244 | 0    | 0     | 1254 | 1244 |
| SF 5 | 1437 | 1408 | 1633 | 0     | 0    | 1465 |
| SF 6 | 1374 | 1363 | 1644 | 0     | 1405 | 0    |

The entry with value 12646 represents that the history of deploy SFCs includes 12646 instances of relations between the SF 3 and SF 4 where the SF 3 is placed before the SF4 in the deployed SFCs. Similarly, each entry in the SFC usage data structure represented a relation between two SFs. Upon receiving a new deployed SFC in the step S20 and detecting a relation between the SF 3 and SF 4 where the SF 3 is placed before the SF 4 in the new deployed SFC in the step S24, the data collecting module 211 adds one to the 12646 to obtain 12647 in the step S25. The relations between the SF 3 and SF 4 has the highest value 12647 in the SFC usage data structure and may be recognized by the SF relation analyzing module 212 as a consistent relationship between the SF 3 and SF 4. The Table 2 may be converted to a matrix, an array, or any appropriate data structure.

The data collecting module 211 obtains administrator configured SF rules (step S26). For example, the administrator configured SF rules include a set of SFs which are required to be included in each deployed SFC, and one or more sets of SFs which are subject to a preset arrangement when deployed. Examples of the SF arrangement rules may include a preset arrangement in which an SF is required to be placed before another SF, a set of SFs which are required to be included in each deployed SFC, and a recognized consistent relationship between SFs.

Figure 5:
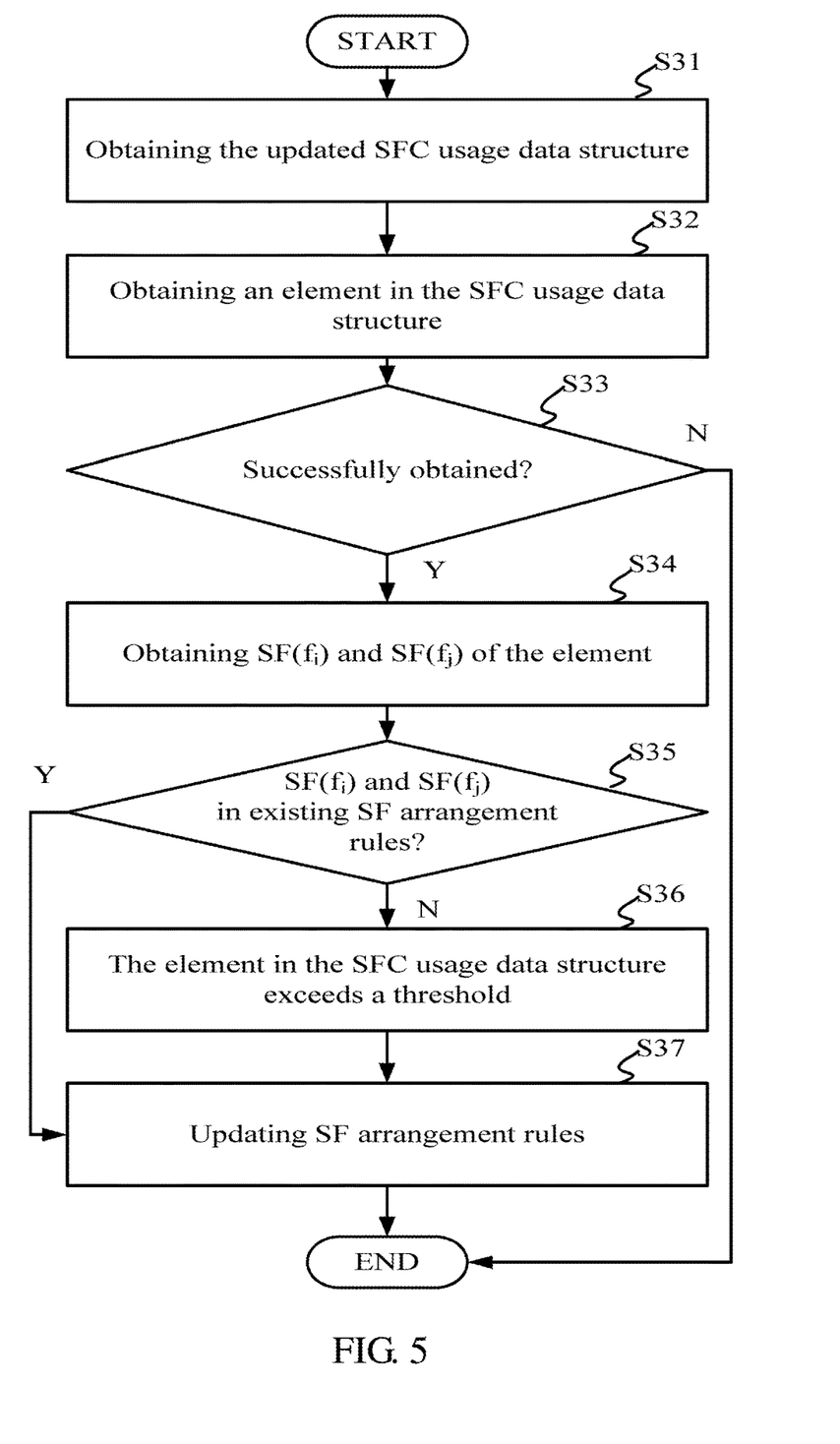
FIG. 5 is a flowchart illustrating a service function relation analyzing process discovering a consistent relation between two service functions.

With reference to FIG. 5, the SF relation analyzing module 212 obtains the updated SFC usage data structure (step S31), and obtains an element in the SFC usage data structure (step S32). Each element in the SFC usage data structure is a statistic value associated with two SFs referred to as SF($f_i$) and SF($f_j$), wherein SF($f_i$) is placed before SF($f_j$). The SF relation analyzing module 212 determines if an element in the SFC usage data structure is successfully obtained (step S33). In a condition where no element in the SFC usage data structure is successfully obtained, the process of the path selection method progresses to FIG. 6, in which the SFC rearranging module 213 arranges SFs in the original SFC to generate a new SFP as an instance of the original SFC.

In a condition where an element in the SFC usage data structure is successfully obtained, the SF relation analyzing module 212 obtains (step S34) and compares (step S35) two SFs, referred to as SF($f_i$) and SF($f_j$) of the element, with the administrator configured SF rules to check if the SF($f_i$) and SF($f_j$) is included in the administrator configured SF rules. In a condition where the SF($f_i$) and SF($f_j$) is included in the administrator configured SF rules, the SF relation analyzing module 212 updates a service function relation table (SFRT) utilizing the element in the SFC usage data structure (step S37). In a condition where the SF($f_i$) and SF($f_j$) are not included in the administrator configured SF rules, the SF relation analyzing module 212 compares the element in the SFC usage data structure with a threshold by determining whether the element in the SFC usage data structure exceeds a threshold (step S36), and updates the service function relation table (SFRT) utilizing the element in the SFC usage data structure that exceeds the threshold. The process of the path selection method progresses to FIG. 6, in which the SFC rearranging module 213 rearranges SFs in the original SFC to generate a new SFC. The SFC rearrangement module 213 utilizes the service function relation table (SFRT) as service function arrangement rules.

Figure 6:
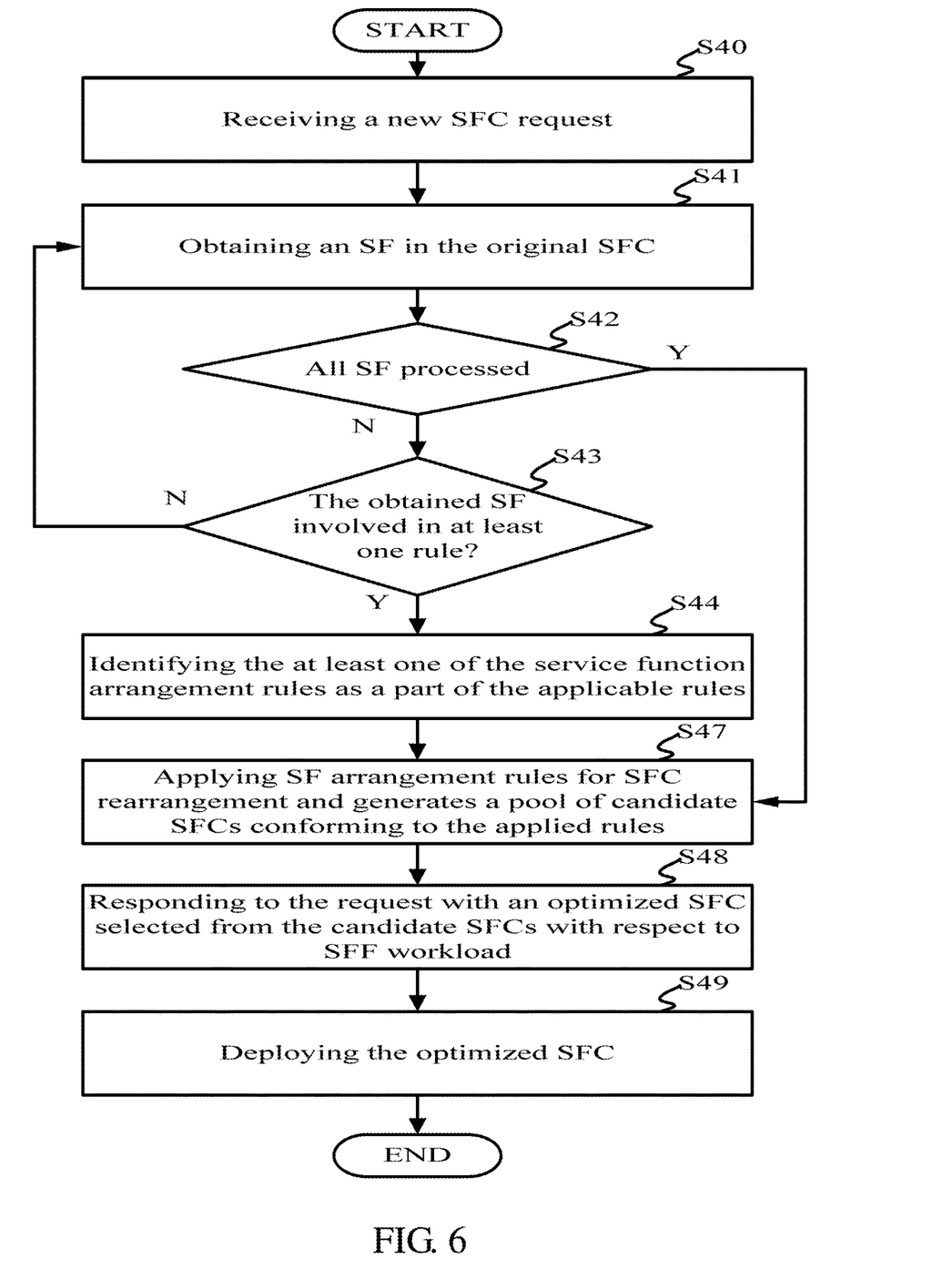
FIG. 6 is a flowchart illustrating a service function rearrangement process.

With reference to FIG. 6, the SFC rearrangement module 213 upon receiving a new SFC request, for example, from the SFC controller 100 (step S40), obtains an SF in the original SFC for lookup of the service function arrangement rules (step S41). The SFC rearrangement module 213 may receive new SFC requests passed from other modules, such as the data collection module 211 or the SF relation analyzing module 212. The SFC rearrangement module 213 sequentially obtains each SF in the original SFC and performs lookup of the service function arrangement rules to retrieve and apply one or more applicable rules. The SFC rearrangement module 213 determines whether an SF is obtained in the step S41 (step S42). In a condition where all SFs in the original SFC have been obtained and processed for lookup of the service function arrangement rules, the SFC rearrangement module 213 applies one or more applicable rules to generate rearranged SFCs (step S47). In a condition where not yet processed SFs in the original SFC is obtained for lookup of the service function arrangement rules, the SFC rearrangement module 213 determines whether the not yet processed SFs are included in at least one of the service function arrangement rules (step S43). In a condition where the not yet processed SFs are included in at least one of the service function arrangement rules, the SFC rearrangement module 213 identifies the at least one of the service function arrangement rules as a part of the applicable rules (step S44). In a condition where the not yet processed SFs are not included in the service function arrangement rules, the SFC rearrangement module 213 repeats step S41. The SFC rearrangement module 213 generates a pool of candidate SFCs conforming to the applicable rules (step S47), and determines an optimized SFC from the candidate SFCs with respect to SFF workload (step S48). In an exemplary embodiment of the disclosure, the SFC rearrangement module 213 selects an SFC with minimized workload of SFFs associated with SFs in the selected SFC as the optimized SFC. For example, the applicable rules include a rule that the SF 4 should follow the SF 3. The rule is created from a consistent relationship between the SFs 3 and 4 in the SFC history of deployed SFCs. The SFC rearrangement module 213 generates a pool of candidate SFCs conforming to the applicable rule. Table 3 shows some of the pool of candidate SFC in which each SFC is represented by an SFC identifier with ordered SFs in the SFC and SFF workloads.

TABLE 3

| SFC Identifier | Ordered SFs in the SFC | SFF workload |
| --- | --- | --- |
| SFC_1 | 5 [3 4] 1 6 | 18 |
| SFC_2 | 5 6 1 [3 4] | 14 |
| SFC_3 | [3 4] 6 5 1 | 12 |
| SFC_4 | 1 [3 4] 6 5 | 10 |
| SFC_5 | 6 [3 4] 5 1 | 18 |
| SFC_6 | 5 [3 4] 6 1 | 16 |
| SFC_7 | [3 4] 5 1 6 | 16 |
| SFC_8 | [3 4] 6 1 5 | 14 |
| SFC_9 | 1 6 5 [3 4] | 14 |
| SFC_10 | 6 [3 4] 1 5 | 18 |
| SFC_11 | 5 1 [3 4] 6 | 12 |
| SFC_12 | [3 4] 5 6 1 | 16 |
| SFC_13 | 1 5 [3 4] 6 | 12 |
| SFC_14 | 1 6 [3 4] 5 | 16 |
| SFC_15 | 6 1 5 [3 4] | 18 |
| SFC_16 | 5 1 6 [3 4] | 16 |
| SFC_17 | [3 4] 1 5 6 | 14 |
| SFC_18 | 1 5 6 [3 4] | 12 |
| SFC_19 | 6 5 [3 4] 1 | 18 |
| SFC_20 | 6 1 [3 4] 5 | 18 |
| SFC_21 | 5 6 [3 4] 1 | 16 |
| SFC_22 | [3 4] 1 6 5 | 16 |
| SFC_23 | 1 [3 4] 5 6 | 12 |
| SFC_24 | 6 5 1 [3 4] | 14 |

Figure 7:
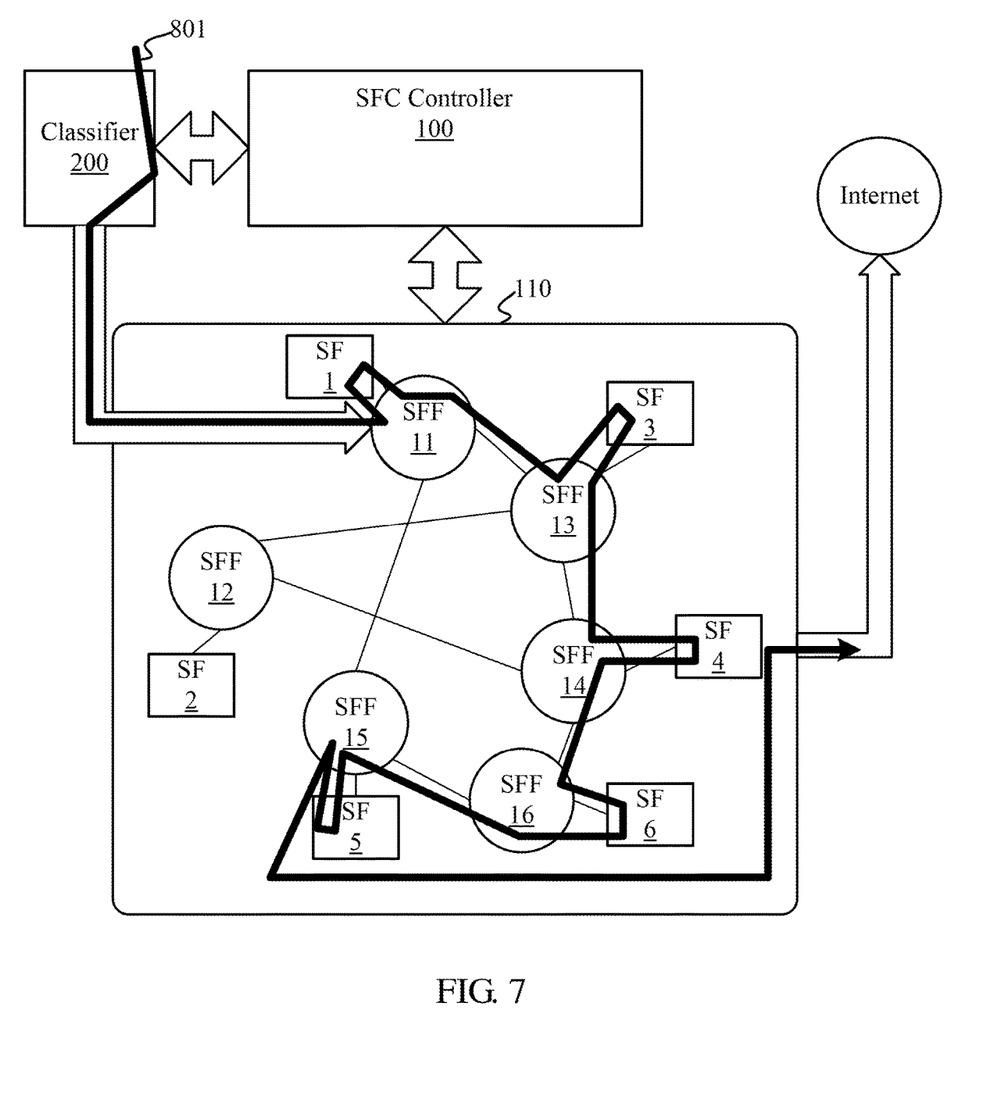
FIG. 7 is block diagram illustrating a packet flow following a rearranged service function path.

With reference to FIG. 7, for example, the SFC classifier 200 may generate and select an optimized SFC with SFC identifier SFC_4 including an ordered set of SFs 1, 3, 4, 6, and 5 after implementing the disclosed path selection method. A flow 801 of SFC packets follows the optimized SFC. Each SFC packet in the flow 801 is processed by the classifier 200 as shown in FIG. 7, the SFF 11, the SF 1, the SFF 11, the SFF 13, the SF 3, the SFF 13, the SFF 14, the SF 4, the SFF 14, the SFF 16, the SF 6, the SFF 16, the SFF 15, the SF 5, and the SFF 15. The workload of the SFFs in SFC_4 is listed in Table 4.

TABLE 4

| SFP Entities | Workload (Number of Times SFF Processing Service is provided for The Same Group Of Packets) |
| --- | --- |
| SFF 11 | 2 |
| SFF 12 | 0 |
| SFF 13 | 2 |
| SFF 14 | 2 |
| SFF 15 | 2 |
| SFF 16 | 2 |

A same group of SFC packets in the flow 801 is forwarded to the SFF 11 for two times according to the SFC_4. In other words, the SFF 11 provides two serving tasks for the same group of SFC packets as shown in FIG. 7. Accordingly, the SFC_4 costs a total of 10 SFFs serving tasks for the flow 801.

The SFC rearrangement module 213 responds to the request with the optimized SFC selected from the candidate SFCs with respect to SFF workload. The service policy deploying module 214 deploys the optimized SFC by deploying service policies to SFC entities in FIG. 1.

Figure 8:
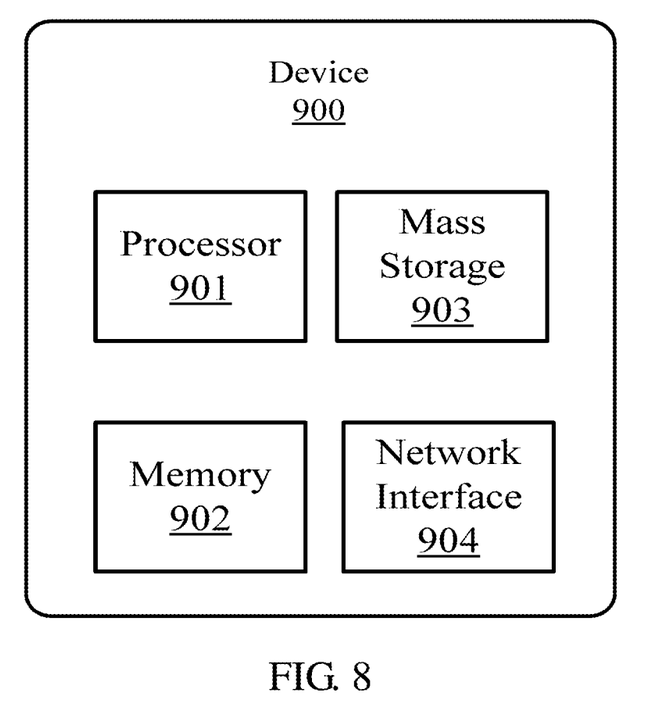
FIG. 8 is a block diagram illustrating an electronic device executing a service function chain path selection method of the present disclosure.

With reference to FIG. 8, the SFC path selection method of the disclosure may be implemented by computer program stored in storage media, such mass storage 903 in a device 900. The computer program implementing the method, when loaded to a memory 902 by a processor 901, directs the processor 901 in the device 900 to execute the SFC path selection method. The processor 901 communicates with other entities through a networking interface 904. Each of the SFC controller, classifier, SFs, and SFFs in FIG. 1 may be implemented as an exemplary embodiment of the device 900. Alternative, any combination of the SFC controller, classifier, SFs, and SFFs in FIG. 1 may simultaneously run in one or more virtual machines in the device 900 or a plurality of exemplary embodiments of the device 900.

The disclosed SFC path selection method receives an SFC request for scheduling an SFC, rearranges the SFC with respect to SFF workload involved in the SFC while conforming to SFC arrangement rules concluded from a history of deployed SFC. The SFC arrangement rules may be created from machine learning processes or manually created by an administrator.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A service function chain (SFC) path selection method executable by an electronic device, comprising:
    receiving a request for scheduling a service function path (SFP); and
    scheduling a set of a plurality of service functions (SFs) as a scheduled SFC to respond to the request, wherein the scheduled SFC is generated with respect to workload of a group of service function forwarders associated with the plurality of service functions and conforms to service function arrangement rules based on an SFC history of deployed SFCs.

2. The method of claim 1, further comprising:
    deploying the scheduled SFC.

3. The method of claim 1, wherein the scheduled SFC is generated from selecting an SFC with a minimized workload of the group of service function forwarders associated with the plurality of service functions.

4. The method of claim 1, wherein the workload of the group of service function forwarders is measured based on service function forwarder serving time of the group of service function forwarders.

5. The method of claim 1, wherein the service function arrangement rules comprise a consistent relationship between two service functions in the SFC history of the deployed SFCs.

6. The method of claim 1, wherein the service function arrangement rules are generated from a machine learning process.

7. The method of claim 1, wherein the service function arrangement rules comprise administrator added rules.

8. A service function chain (SFC) path selection system, applicable in a device, the device comprising:
- at least one processor;
- a storage unit; and
- one or more programs that are stored in the storage unit and executed by the at least one processor, the one or more programs comprising instructions for:
- receiving a request for scheduling a service function path (SFP); and
- scheduling a set of a plurality of service functions (SFs) as a scheduled SFC to respond to the request, wherein the scheduled SFC is generated with respect to workload of a group of service function forwarders associated with the plurality of service functions and conforms to service function arrangement rules based on an SFC history of deployed SFCs.

9. The system of claim 8, the one or more programs further comprising instructions for:
- deploying the scheduled SFC.

10. The system of claim 8, wherein the scheduled SFC is generated from selecting an SFC with a minimized workload of the group of service function forwarders associated with the plurality of service functions.

11. The system of claim 8, wherein the workload of the group of service function forwarders is measured based on service function forwarder serving time of the group of service function forwarders.

12. The system of claim 8, wherein the service function arrangement rules comprise a consistent relationship between two service functions in the SFC history of the deployed SFCs.

13. The system of claim 8, wherein the service function arrangement rules are generated from a machine learning process.

14. The system of claim 8, wherein the service function arrangement rules comprise administrator added rules.

* * * * *